United States Patent
Suzuki et al.

(10) Patent No.: US 7,894,314 B2
(45) Date of Patent: Feb. 22, 2011

(54) RECORDING SYSTEM AND PROGRAM FOR RECORDING DATA

(75) Inventors: Satoshi Suzuki, Nagoya (JP); Masaki Tahira, Takahama (JP)

(73) Assignee: Denso Corporation, Kariya (JP)

( * ) Notice: Subject to any disclaimer, the term of this patent is extended or adjusted under 35 U.S.C. 154(b) by 1133 days.

(21) Appl. No.: 11/600,100

(22) Filed: Nov. 16, 2006

(65) Prior Publication Data

US 2007/0115763 A1    May 24, 2007

(30) Foreign Application Priority Data

Nov. 24, 2005 (JP) ............................. 2005-338595
Jul. 25, 2006 (JP) ............................. 2006-202186

(51) Int. Cl.
    G11B 7/085    (2006.01)
(52) U.S. Cl. ............... 369/47.28; 369/30.03; 369/30.08
(58) Field of Classification Search ............... 369/30.1, 369/47.28, 30.03, 124.14, 30.08; 360/73.06, 360/73.08
    See application file for complete search history.

(56) References Cited

U.S. PATENT DOCUMENTS

2004/0257939 A1* 12/2004 Kawamura ............... 369/47.23
2005/0237900 A1* 10/2005 Sano et al. ............. 369/112.08

FOREIGN PATENT DOCUMENTS

JP    A-2001-210009    8/2001
JP    A-2003-331538    11/2003

* cited by examiner

*Primary Examiner*—William J Klimowicz
*Assistant Examiner*—Andrew J Sasinowski
(74) *Attorney, Agent, or Firm*—Posz Law Group, PLC

(57) ABSTRACT

A recording system records data by retrieving it from a portable medium such as CD-ROM or the like. The recording system determines a data retrieval speed for a specific data track on the portable medium by calculating a retrieval time of the specific data track at an increased retrieval speed and a playback time of a preceding data track on the portable medium. When the retrieval time of the specific data track at the increased retrieval speed is smaller than the playback time of the preceding data track, the recording system reduces the retrieval speed for the specific data track.

6 Claims, 4 Drawing Sheets

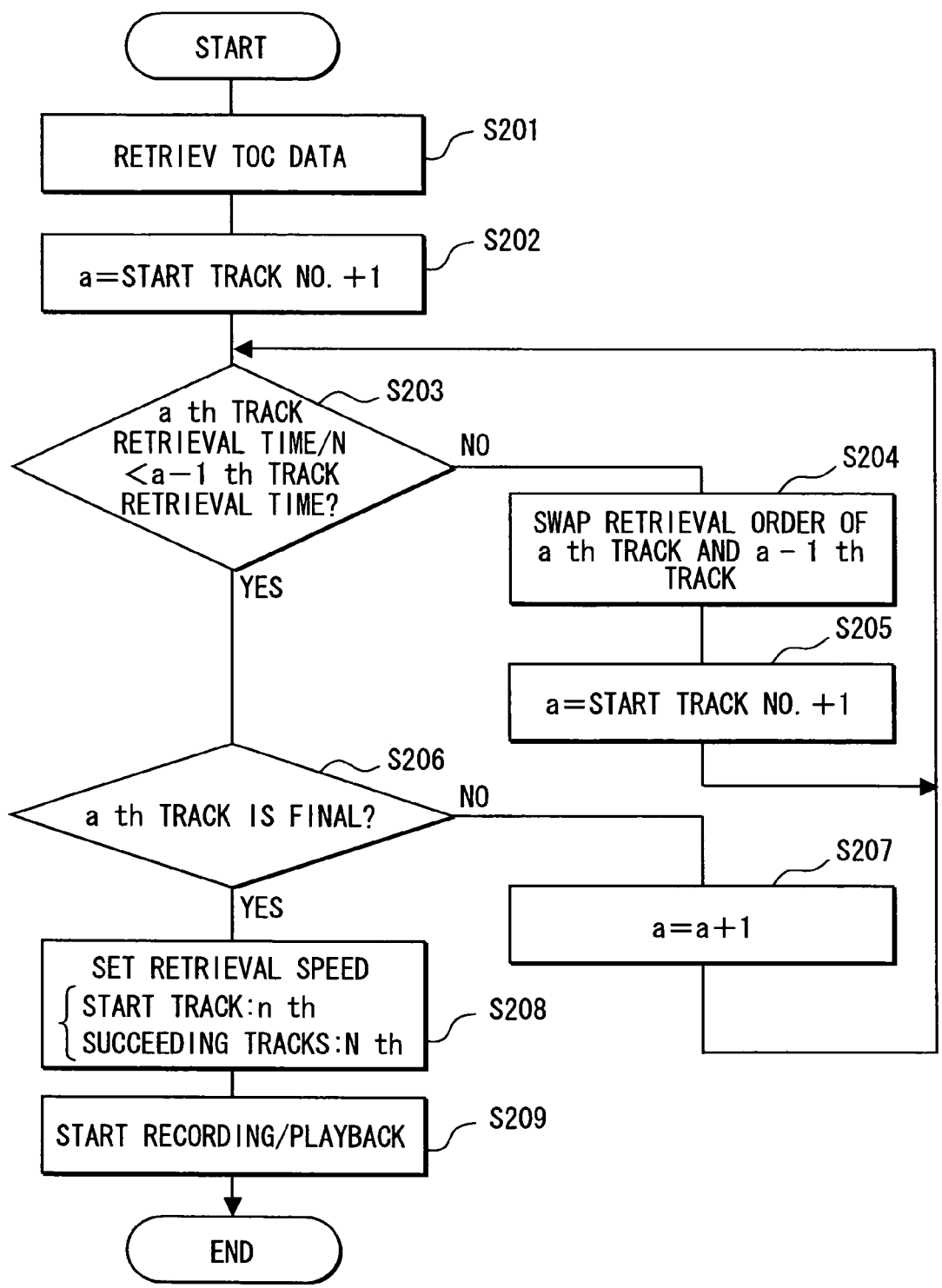

RECORDING SYSTEM AND PROGRAM FOR RECORDING DATA

CROSS REFERENCE TO RELATED APPLICATION

This application is based on and claims the benefit of priority of Japanese Patent Application No. 2005-338595 filed on Nov. 24, 2005, and No. 2006-202186 filed on Jul. 25, 2006, the disclosure of which is incorporated herein by reference.

FIELD OF THE INVENTION

The present invention generally relates to a data recorder used in a vehicle.

BACKGROUND OF THE INVENTION

In recent years, a recording system for recording and playing music data that is, for example, retrieved from Compact Disc (registered trademark) and stored on a hard disk drive or the like is provided for sale in a market. The recording system on this kind is typically installed as a navigation system or a audio system on a vehicle.

Some of the recording systems described above are capable of, for example, recording and playing the music data at the same time for accommodating user's needs on the vehicle. The recording system usually records the music data in a PCM format by reading it faster than a playback speed (e.g., a double (2×) speed, a 4× speed or the like in comparison with the playback speed) for reducing the recording time.

However, the increased recording speed (i.e., the reading speed) of the recording system tends to cause a recording error during recording of the music data. One of the cause of the recording error is a vibration of the vehicle. That is, the increased recording speed forces a CD drive or the hard disk drive to operate at an increased speed, thereby causing an unstableness in reading/recording operation when the vibration of the vehicle is added thereto. As a result, the recording system suffers from the recording error during the recording of the music data in the increased recording speed. The recording error is especially problematic when the recording system is used as a part of the navigation system/audio system on the vehicle where the navigation/audio system are typically exposed to a severe vibration during its operation.

In addition, the navigation system may try to access the hard disk drive for retrieving required data such as map data or the like at the same time when the audio system is playing back the music data. When the hard disk drive is in demand for access from plural systems, one of the access may be blocked by the other access. That is, in this case, the access to the hard disk drive from the audio system for recording the music data is occasionally blocked by the access from the navigation system. As a result, the recording of the music data at the increased speed is aborted as the recording error.

Chances of the recording error can be reduced by decreasing the recording speed. However, the user's needs for reducing the recording time is compromised.

The Japanese patent document No. JP-A-2001-210009 discloses an error handling process during a dubbing operation (i.e., a recording operation) of the CD music data. In this disclosure, a dubbing system goes back to a start point of a recording track and restarts the dubbing operation at a reduced dubbing speed when an error is detected during the dubbing operation at an increased dubbing speed.

However, the error handling process described above is problematic for handing the error in the recording and reading operations conducted at the same time in the following aspect. That is, the playback of the music data of the recording track returns to the start point of the recording track when data retrieval position returns to the start point of the recording track due to the recording error. The jumpiness of the playback of the music data makes the user feel uncomfortable.

The problem described above may also be experienced when the hard disk drive is involved in recording movie data while it is being played back. That is, the movie data of the recording track may suffer from dropping frames due to the recording error when the data is being played back at the same time with recording.

SUMMARY OF THE INVENTION

In view of the above-described and other problems, the present disclosure provides a recording system that controls a recording speed of data tracks for recording the data in a reduced time without compromising robustness for recording error such as jumpiness and/or dropping frames experienced in a playback of the data.

In one aspect of the present disclosure, the recording system determines a retrieval speed of each of the data tracks based on a relationship between a retrieval time (i.e., a recording time) of a certain data track and a playback time of a preceding data track.

More practically, the recording system includes a recording unit for recording the data tracks, a playback unit for playing the data tracks, a retrieval unit for retrieving the data tracks in a data sequence, a control unit, and a retrieval speed setting unit for setting a retrieval speed of the data track. The retrieval speed of the retrieval unit is variable between a standard speed and a fast speed that is faster than the standard speed by a preset magnitude. The control unit executes two processes in parallel, that is, the first process for recording the data sequence on the recording unit at a recording speed that is identical to the retrieval speed used for retrieval of the data sequence from the portable data medium by the retrieval unit, and the second process for playing the data sequence at the standard speed sequentially. The retrieval speed setting unit determines whether the retrieval time of one of the data tracks by the fast speed is smaller than a playback time of a preceding data track in the data sequence.

The retrieval speed setting unit sets the fast speed as the retrieval speed for retrieving the one of the data tracks when the retrieval time of the one of the data tracks is smaller than the playback time of the preceding data track in the data sequence, or sets a medium speed that is in a speed range between the standard speed and the fast speed as the retrieval speed for retrieving the one of the data tracks when the retrieval time of the one of the data tracks by the fast speed is not smaller than the playback time of the preceding data track in the data sequence. Then, the control unit uses the retrieval speed set by the retrieval speed setting unit for retrieving the data tracks in the data sequence by the retrieval unit.

Each of the data tracks in the data sequence described above corresponds to a piece of music on a music CD, that is, a divisional unit of data in a table of contents of music being functionally or semantically distinguishable from other divisional unit.

The retrieval speed control process is explained in the following by taking an example of recording (i.e., retrieving) the a th track at an N th speed and simultaneously playing the a−1 th track in the data sequence. If the retrieval time of the a th track by the N th speed (i.e., the playback time of the a th track divided by N) is smaller than the playback time of the a−1 th track, the retrieval of the a th track finishes before the playback of the a−1 th track completes. Therefore, there is no chance that the retrieval of a certain track (e.g., the a th track in the data sequence) and the playback of the same track occur at the same time. On the contrary, if the retrieval time of the a th track by the N th speed (i.e., the playback time of the a th track divided by N) is greater than the playback time of the a−1 th track, the retrieval of the a th track does not finish before the playback of the a−1 th track completes. That is, the playback of the a th track begins while the same track is still being retrieved for recording. In this case, when the recording of (i.e., the retrieval for recording) the track is interrupted or failed due to mechanical vibration or the like while the same track is being played back, the retrieval of the track data returns to a start point of the track, thereby causing a playback error such as jumpiness of the sound or the like. Further, even when the retrieval of the a th track begins after the start of the playback of the a−1 th track, the retrieval of the a th track finishes earlier than the end of the playback of the a−1 th track if the remaining playback time of the a−1 th track is longer than the retrieval time of the a th track by the N th speed.

In view of the above-described situation, the recording system of the present disclosure uses the fast speed for retrieving the data track when the retrieval time of the data track by the fast speed is smaller than the playback time of the preceding data track in the data sequence. In this manner, the playback of the preceding track does not catch up the retrieval of a following track. Therefore, a retry of the retrieval from the start point of the following track due to a recording error does not lead to the playback error of the preceding track. That is, when the retrieval time of a certain track by the fast speed is smaller than the playback time of the preceding track, the fast speed of the retrieval enables the recording system to record the certain track in a reduced time without suffering from the playback error that results from the retrieval error of the preceding track.

On the other hand, when the retrieval time of the certain track by the fast speed is not smaller than the playback time of the preceding track, the retrieval speed of the certain track is changed to the medium speed so that the risk of the retrieval error is reduced. In this case, the playback of the preceding track may finish earlier than the end of the retrieval of the following track by the fast speed. Therefore, the retrieval of the following track is set to be conducted by the medium speed for reducing the chance of the retrieval error in order not to cause a retry that leads to the playback error. A suitable value of the medium speed is determined by experiment or the like in advance for use in the recording. The medium speed is preferably tuned to a fastest possible speed in a speed range that is not prone the recording error even in an environment under an expected level of vibration or the like.

The recording system of the present invention is capable of recording the data sequence in a reduced time by preventing the recording error (i.e., the retrieval error) such as jumpiness and/or dropping frames that is inevitably accompanied by the playback error based on a comparison of the retrieval time of the present track by a certain speed to the playback time or the remaining playback time of the preceding track.

According to the above recording and retrieval scheme, the retrieval speed is set to the medium speed when, for example, the retrieval time of the a th track by the N th speed is not smaller than the playback time of the a−1 th track. That is, in this case, the retrieval speed is reduced in advance to lower the chance of the recording/retrieval error that leads to the playback error and the retry of the playback. However, the retrieval time of the data sequence is compromised to have a greater value in comparison to the retrieval time by using the fast speed.

In another aspect of the present disclosure, the recording system of the present disclosure rearranges the retrieval/recording order of the data sequence when the retrieval time and the playback time fulfill the above relationship. That is, the retrieval order of the data tracks are rearranged so that the retrieval time of the present track by the medium speed is always smaller than the playback time of the preceding track. In this manner, the data sequence after rearrangement can be retrieved and recorded in a reduced amount of time without suffering from the playback error even when the initial recording/retrieval order is not suitable for the recording by the fast speed. Even in this case, the first data track after rearrangement is always retrieved and played back simultaneously. Therefore, the retrieval speed for the first (starting) track is set to the medium speed (i.e., an n th speed that is faster than the standard speed and slower than the fast speed) in order to reduce the chance of the retrieval error that leads to the playback error.

The recording system of the present disclosure having above-described features is effectively used in an environment under a severe vibration condition such as a CD drive or the like for use in a vehicle. Further, the media drive such as the CD drive or the like in the vehicle may be used in a similar manner with the recording system of the recording in terms of having access, for example, from an audio system and a navigation system at the same time. Therefore, the media drive for use in the vehicle is effectively improved by implementing the recording scheme of the recording system of the present disclosure when the drive is simultaneously accessed from multiple systems for data retrieval/recording and data playback.

BRIEF DESCRIPTION OF THE DRAWINGS

Other objects, features and advantages of the present invention will become more apparent from the following detailed description made with reference to the accompanying drawings, in which:

FIG. 4 shows a flowchart of a retrieval speed setting process with a retrieval order rearrangement in the control unit of the navigation system.

DETAILED DESCRIPTION OF THE PREFERRED EMBODIMENTS

An embodiment of the present disclosure is described with reference to the drawings. Like parts have like numbers in each variation of the embodiments when the embodiment is described for more than one case.

Figure 1:
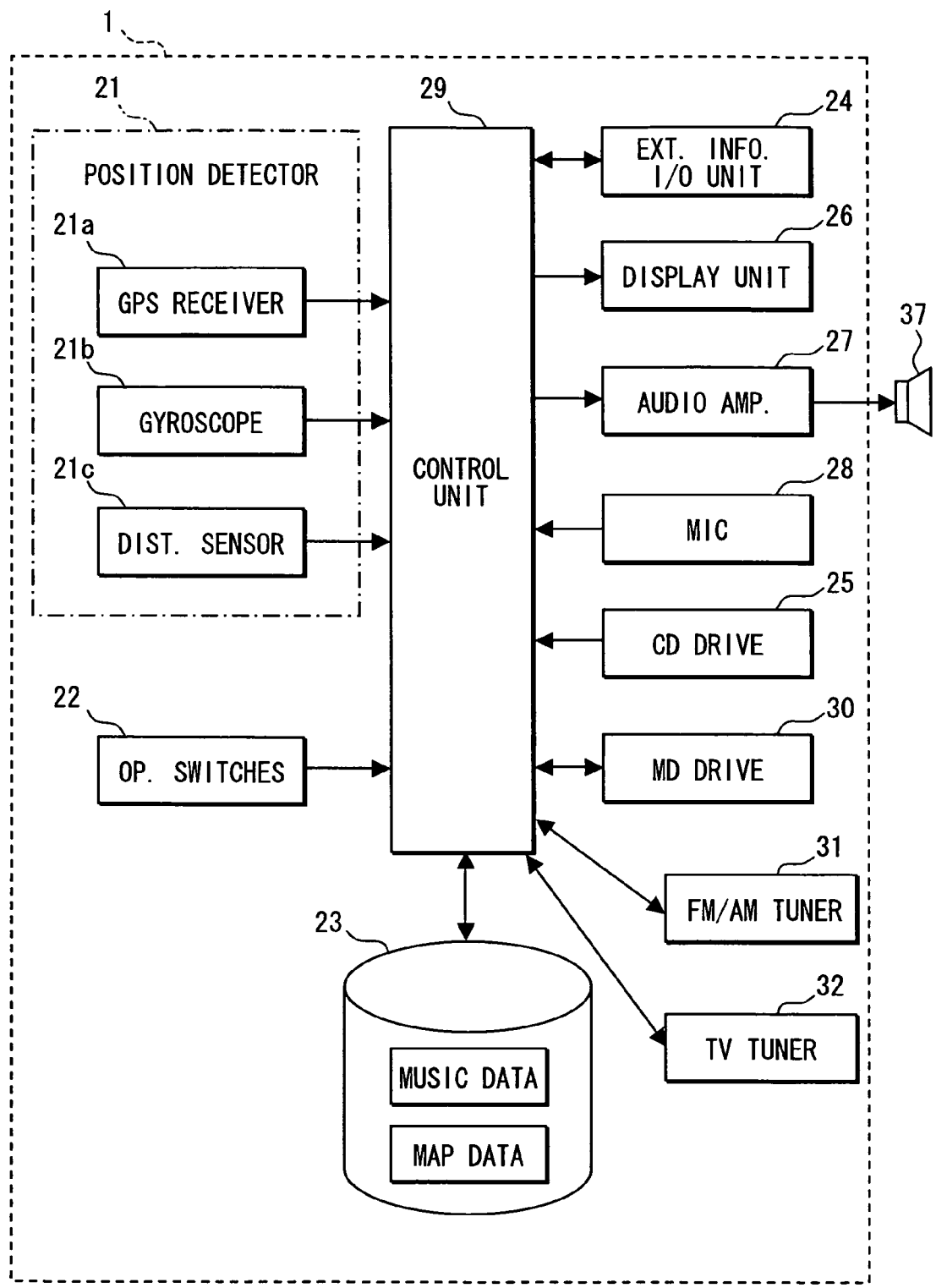
FIG. 1 shows a block diagram of a navigation system in an embodiment of a present disclosure.

FIG. 1 shows a block diagram of an audio-visual navigation system 1 in the embodiment of a recording system. The navigation system 1 is used as an integral part of a vehicular system that is expected to have popularity with capabilities of playing CD/MDs, receiving TV/FM/AM programs as well as providing a navigation function.

The navigation system 1 includes a position detector 21, operation switches 22, a hard disk drive 23, an external information input unit 24, a CD drive 25, a display unit 26, an audio amplifier 27, a speaker 37, a microphone 28, an MD driver 30, an FM/AM tuner 31, a TV tuner 32, and a control unit 29 for controlling above-described components. The position detector 21 detects a current position of a vehicle, and the operation switches 22 are used by a user for inputting various instructions. The hard disk drive 23 stores various types of data, and the external information input/output unit 24 and the CD drive 25 are used for inputting and outputting various types of information from/to an external device. The display unit 26 displays a map and various types of information. The audio amplifier 27 and the speaker 37 are used for outputting various voices, and the microphone 28 is used for inputting the voice.

The position detector 21 includes a GPS (Global Positioning System) receiver 21a that receives a radio wave from a GPS satellite through an antenna (not shown in the drawings) by using a GPS antenna for detecting a position of the vehicle, a direction of travel, a speed of the vehicle and the like, a gyroscope 21b that detects a rotation of a vehicle body, a distance sensor 21c that detects a travel distance of the vehicle based on acceleration or the like in a front-rear direction of the vehicle. The receiver and the sensors 21a to 21c respectively generate detection signal having errors of different natures, thereby being used for compensating the errors of the different nature with each other.

The operation switches 22 includes a touch panel that is disposed on, for example, a display screen of the display unit 26, and mechanical switches or the like around the display unit 26. The touch panel is integrally layered on the display unit 26, and the touch panel detects a touch input by using any one of various methods such as a pressure sensing method, an electromagnetic induction method, an electrostatic capacity method, or a combination of these methods.

The external information input unit 24 has an antenna (not shown) connected thereto, and receives traffic information from a traffic information center through the antenna. The traffic information is transferred to the control unit 29 for calculation of a navigation route or the like. In addition, the external information input unit 24 can be coupled with Internet by using a mobile terminal such as a cellular phone or the like for acquiring various kinds of information.

The CD drive 25 is a device used for inputting various types of data stored on a CD-ROM (not shown). The CD drive 25 accepts data from, for example, a map data CD-ROM that stores map data (e.g., road shape data, road width data, road regulation data, geographical feature data, mark data, intersection data, facility data and the like), a music data CD-ROM that stores music data and the like. The CD drive 25 operates at various retrieval speeds that are within a speed range between a standard retrieval speed and a fast-pace retrieval speed. The standard retrieval speed is a speed that is same as a playback speed of music data. The fact-pace retrieval speed is, for example, a retrieval speed that is twice, four times, or eight times faster than the standard retrieval speed. In addition, the CD drive 25 may be substituted with other type of drives such as a DVD drive or the like, when a data medium is a DVD-ROM or the like. Therefore, the data may be retrieved from both of the CD drive and the DVD drive, or a single data drive may accommodate both of the CD-ROM and the DVD-ROM.

Music data retrieved from a music CD by the CD drive 25 is stored on the hard disk driver 23. Further, the map data, facility guidance, guidance voice data and the like retrieved from the map data CD-ROM can also be stored on the hard disk drive 23.

The display unit 26 uses a liquid crystal display, an organic EL display, or a CRT display for displaying map data and various information in color. The display screen of the display unit 26 displays, for example, a vehicle position mark at a current vehicle position detected by the position detector 21 on the map data inputted from the CD drive 25, and a navigation route toward a destination of a travel as well as place names, landmarks, facilities with guidance information on top of other additional data.

The audio amplifier 27 amplifies voice data for outputting a voice from the speaker 37. The speaker 37 installed in the vehicle has plural sound output units of, for example, two, four, five or more pieces. Guidance voice based on guidance data for the facilities and other sound/voice data stored on the hard disk drive 23 and/or music data stored thereon for playback are provided for the user from the speaker 37 as a result of a control process under control of the control unit 29. Further, the sound and/or the voice in a broad signal received by the FM/AM tuner 31 or the TV tuner 32 are also provided for the user from speaker 37.

The microphone 28 is used to output an electric signal based on an input of a user's voice. The user uses the microphone 28 to control the navigation system 1 by inputting various instruction voices.

The control unit 29 includes a CPU, a memory such as a ROM, a RAM or the like, an encoder, a decoder, a D/A converter, an I/O and a bus line for connecting those components (not shown in the drawings). The control unit 29 uses a program stored in the memory for controlling various processes.

The various processes include, for example, a navigation related process such as a map display process for displaying a map on the display unit 26 based on a current position of the vehicle derived from the detection signals of the position detector 21 and a map data retrieved from the hard disk drive 23, a navigation route calculation process for calculating a navigation route from the current position toward a destination based on a calculation of an optimum route that leads to the destination specified by controlling the operation switches 22 with reference to location data stored on the hard disk drive 23, and other processes.

The various processes further include a recording process that records the music data retrieved from the music CD by the CD drive 25 on the hard disk drive 23, and a playback process for outputting the music data to the audio amplifier 27 based on the music data retrieved from the hard disk drive 23.

The control unit 29 executes the recording process and the playback process at the same time in parallel. In this case, the control unit 29 controls the CD drive 25 for retrieving the music data from the music CD. The retrieved music data is compressed by the encoder in an encoded format for storage on the hard disk drive 23, and the control unit 29 writes the music data in the encoded format on the hard disk drive 23. The music data stored on the hard disk drive 23 is retrieved from the hard disk drive 23 for decoding by the decoder simultaneously with a write operation on the hard disk drive 23, and the decoded music data is converted to an analog signal by the D/A converter to be transferred to the audio amplifier 27. The analog signal transferred to the audio amplifier 27 is amplified by the audio amplifier 27, and is output from the speaker 37 as a sound. In this manner, the music data of the music CD can be recorded and played back at the same time. Further, the navigation system 1 can record and play respectively different pieces of the music data at the same time in the above-described manner.

A retrieval speed setting process for each track of the music data in a simultaneous playback recording of the music CD is described in the following. The control unit 29 can change the retrieval speed for each track of the music data in the simultaneous playback recording. The control unit 29 sets the retrieval speed to either of a high retrieval speed or a low retrieval speed in the simultaneous playback recording. That is, the high retrieval speed is designated as an N th speed in the following description and may correspond to, for example, a fourth speed that is four times faster than a standard retrieval/playback speed. The low retrieval speed is designated as an n th speed in the following description and may correspond to, for example, a second speed that is twice as fast as the standard speed.

Figure 2:
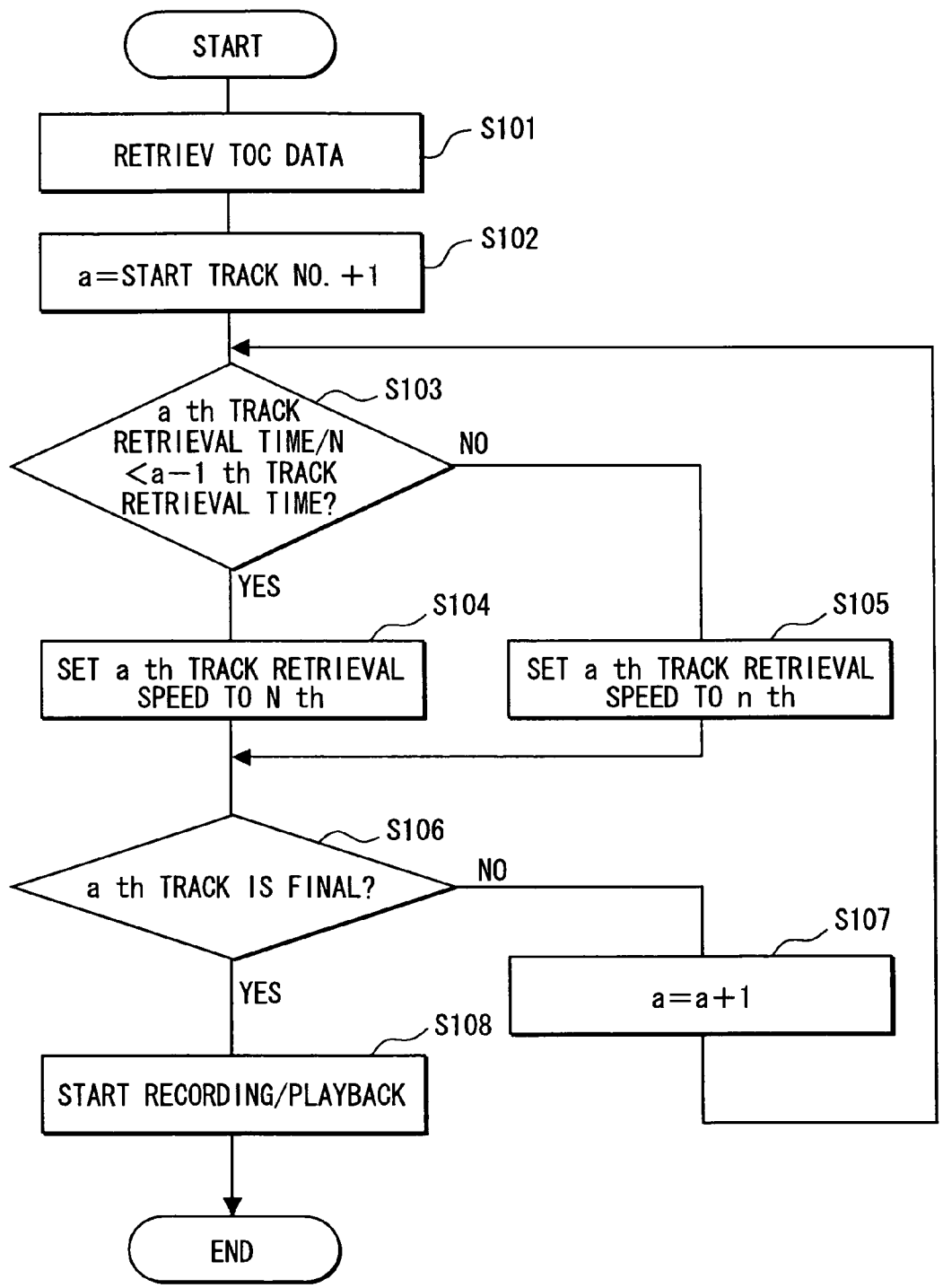
FIG. 2 shows a flowchart of a retrieval speed setting process in a control unit of the navigation system in the embodiment of the present disclosure.

FIG. 2 shows a flowchart of the retrieval speed setting process in the control unit 29 of the navigation system 1 in the embodiment of the present disclosure.

The retrieval speed setting process precedes a start of the simultaneous playback recording of the music CD.

In step S101, the process being executed in the control unit 29 retrieves a TOC data from the music CD when the music CD is inserted into the CD drive 25, or when an instruction for the simultaneous playback recording is inputted to the control unit 29 from the operation switches 22 with the music CD being inserted in the CD drive 25. The TOC data has control information such as the number of music tracks recorded on the CD, a total time of the music data and the like. The control unit 29 reads data regarding a playback time of each track on the music CD and a playback order of the tracks from the control information in the TOC data.

In step S102, the process substitutes a start track number plus 1 for a counter variable 'a'. The start track number is the number of the track at which the simultaneous playback recording starts.

In step S103, the process determines whether a retrieval time of the a th track by the N th speed (i.e., the playback time of the a th track divided by N) is smaller than the playback time of the a−1 th track based on the playback time of each track retrieved in step S101. The process proceeds to step S104 when the retrieval time of the a th track is smaller than the playback time of the a−1 th track (step S103: YES). The process proceeds to step S105 when the retrieval time of the a th track is not smaller than the playback time of the a−1 th track (step S103: NO).

In step S104, the process sets the retrieval speed for the a th track to the N th speed, and proceeds to step S106. In other words, because the retrieval time of the a th track by the N th speed is smaller than the playback time of the a−1 th track, the playback of the a−1 th track does not finish to proceed to the playback of the succeeding a th track while the a th track is being recorded by the N th speed. Therefore, the music data of the track a can be recorded in a reduced time by the high retrieval speed (N th speed) without suffering from a playback error (e.g., jumpiness in the playback).

In step S105, the process sets the retrieval speed for the a th track to the n th speed, and proceeds to step S106. In this case, because the retrieval time of the a th track by the N th speed is not smaller than the playback time of the a−1 th track, the playback of the a−1 th track may possibly catch up the recording of the a th track by the N th speed. Therefore, the retrieval speed for the track a is set to the low speed (i.e., the n th speed) in advance for reducing risk of the recording error that leads to the playback error (e.g., jumpiness in the playback). The n th speed for the retrieval may be determined by experiment and stored in the memory in the control unit 29 in advance.

The n th speed may preferably be determined to a highest possible speed for reduction of the recording time based on the tolerance of the recording function against expected error factors such as the vibration of the vehicle or the like.

The start track of the recording and the playback is always the same track because the recording and the playback start at a same lead track of the music CD. Therefore, the retrieval speed for the start track is set to the low speed (the n th speed) in the present embodiment. In this manner, the risk of the recording error that leads to the playback error due to the vibration (e.g., jumpiness in the playback) is reduced.

In step S106, the process determines whether the a th track is a final track for the playback/recording. The process proceeds to step S107 to increment the counter a by 1 ('a+1' is substituted for 'a') when the a th track is not the final track (step S106: NO). The process returns to step S103 after the count up of the counter variable 'a' in step S107. The process proceeds to step S108 when the a th track is the final track (step S106: YES).

In step S108, the process starts the recording and the playback of each track by the retrieval speed respectively determined in steps S104 and S105.

Figures 3A, 3B:
FIGS. 3A and 3B show sequence diagrams of track retrieval orders in the embodiment of the present disclosure.

FIGS. 3A and 3B show sequence diagrams of track retrieval orders in the embodiment of the present disclosure. The diagrams show the relationship between the retrieval time and the playback time of the tracks.

FIG. 3A shows a sequence diagram of a retrieval order starting from track A toward track D. In this case, each ratio of the retrieval time of the track B to track D divided by the retrieval speed N is greater than the playback time of the preceding track (i.e., track A to track C). Therefore, the retrieval speed for all of the tracks (i.e., track A to track D) is set to n th (the low retrieval speed) according to the retrieval speed setting process shown in FIG. 2. As a result, the recording time of the music CD takes longer time than the recording by the high retrieval speed.

The problematic situation described above can be resolved by swapping the retrieval order of the tracks when the retrieval time of a certain track by the high retrieval speed is greater than the playback time of the preceding track. The sequence diagram in FIG. 3B shows that an rearranged retrieval order after repeatedly swapping the two successive tracks according to the above-described rule. The rearranged tracks in an order from track D toward track A can now be recorded by the high retrieval speed except for the track D because the retrieval time of each track is smaller than the playback time of its preceding track. In other words, the playback of the preceding track (tracks D to B in FIG. 3B) does not finish while recording the music data of the following track (tracks C to A in FIG. 3B) by the high retrieval speed, thereby minimizing the total recording time.

Therefore, the navigation system 1 may execute a retrieval speed setting process with a retrieval order rearrangement in FIG. 4 instead of the retrieval speed setting process shown in FIG. 2. The retrieval speed setting process with a retrieval order rearrangement precedes the simultaneous playback recording of the music CD in the same manner as the retrieval speed setting process.

In step S201, the process being executed in the control unit 29 retrieves a TOC data from the music CD when the music CD is inserted into the CD drive 25, or when an instruction for the simultaneous playback recording is inputted to the control unit 29 from the operation switches 22 with the music CD being inserted in the CD drive 25. The TOC data has control information such as the number of music tracks recorded on the CD, a total time of the music data and the like. The control unit 29 reads data regarding a playback time of each track on the music CD and a playback order of the tracks from the control information in the TOC data.

In step S202, the process substitutes the start track number plus 1 for the counter variable 'a'. The start track number is the number of the track at which the simultaneous playback recording starts.

In step S203, the process determines whether the retrieval time of the a th track by the N th speed (i.e., the playback time of the a th track divided by N) is smaller than the playback time of the a−1 th track based on the playback time of each track retrieved in step S201. The process proceeds to step S204 when the retrieval time of the a th track is not smaller than the playback time of the a−1 th track (step S203: NO). The process proceeds to step S205 when the retrieval time of the a th track is smaller than the playback time of the a−1 th track (step S203: YES).

In step S204, the process swaps the retrieval order of the a th track and the a−1 th order. That is, because the retrieval time of the a th track is greater than the playback time of the a−1 th track, the playback of the a−1 th track may possibly finish to proceed to the playback of the a th track before the recording of the a th track by the N th speed finishes. In other words, swapping the retrieval order of the a th track and the a−1 th track makes it impossible that the playback of the preceding track finishes earlier to catch up the recording of the following track.

In step S205, the process substitutes the start track number plus 1 for the counter variable 'a' again. The process returns to step S203 after setting the counter variable 'a'. In this manner, the process repeatedly determines the relationship of the retrieval time and the playback time of the two successive tracks in the rearranged order.

In step S206, the process determines whether the a th track is the final track for the playback/recording. The process proceeds to step S207 to increment the counter variable 'a' by 1 ('a+1' is substituted for 'a') when the a th track is not the final track (step S206: NO). The process returns to step S203 after the count up of the counter variable 'a' in step S207. The process proceeds to step S208 when the a th track is the final track (step S206: YES).

The process repeats steps S203 to S207 to rearrange the retrieval order of the tracks until two successive tracks always fulfill the relationship described above. That is, the retrieval order of the two successive tracks is rearranged based on the comparison so that the retrieval time of the following track by the high retrieval speed is smaller than the playback time of the preceding track one by one. For example, the retrieval order of the tracks in FIG. 3A is rearranged to the retrieval order of the tracks in FIG. 3B by repeating steps S203 to S205.

In step S208, the process sets the retrieval speed for the start track to the n th speed (the low retrieval speed), and sets the retrieval speed for all of the succeeding tracks to N th speed (the high retrieval speed).

As a result, each of the tracks (except for the start track) in the retrieval order after rearrangement does not finish its playback while the following track is being recorded, because the retrieval time of each track by the N th speed is always smaller than the playback time of the preceding track. In other words, the playback of the preceding track does not catch up the recording of the following track. In this manner, the recording time of the tracks can be minimized by setting the N th retrieval speed for all of the succeeding tracks after the start track without suffering from the playback error (e.g., jumpiness of the playback).

The start track of the recording and the playback is always the same track because the recording and the playback start at a same lead track of the music CD. Therefore, the retrieval speed for the start track is set to the low speed (the n th speed) in the present embodiment. In this manner, the risk of the recording error that leads to the playback error due to the vibration (e.g., jumpiness in the playback) is reduced.

In step S209, the process starts the recording and the playback of each track by the retrieval speed determined in step S208 and the rearranged retrieval order in steps S203 to S205.

The navigation system 1 in the present embodiment is advantageous in the following manner in comparison to the conventional system.

(1) The retrieval speed suitably determined by the control unit 29 enables the navigation system 1 to record the music tracks on the music CD in a reduced time without increasing chances of recording error that leads to the playback error such as jumpiness or the like. This feature is especially advantageous for a vehicular system intended for use in a severe vibration environment.

(2) The recording time of the music CD is minimized by the rearrangement of the retrieval order of the music tracks based on the comparison of the retrieval time and the playback time of the two succeeding tracks.

(3) The chances of the playback error due to the access to the hard disk drive by the navigation system that interrupts the recording of the music CD is minimized by the reduction of the recording time.

The track up/down operation can be performed during the playback of the tracks. However, the track up/down operation for a currently recording track is prohibited in the present embodiment because the track up/down operation for the recording track causes the interference between the recording track and the played back track.

Although the present invention has been fully described in connection with the preferred embodiment thereof with reference to the accompanying drawings, it is to be noted that various changes and modifications will become apparent to those skilled in the art.

For example, the retrieval time of the a th track by the N th speed (the playback time of the a th track divided by N) may be compared with a remaining playback time of the a−1 th track instead of the playback time of the a−1 th track for determining the retrieval order or the retrieval speed. In this manner, the jumpiness in the playback can more securely be prevented.

Further, the recoding/playback scheme of the present disclosure can also be applied to the data such as animation data (e.g., movies, promotion videos, or the like), voice data (e.g., a read speech of a novel or the like), text data (e.g., news articles, novels or the like), and the like. That is, the recording and playback processed in parallel for those data can benefit from the variable recording speed in the present disclosure.

Furthermore, the recording/playback scheme can also be applied to the data provided by the medium such as a DVD-ROM or the like. In this case, the data of the medium can be retrieved from a DVD drive that is coupled with the navigation system or CD/DVD multi drive that accepts both of the CD-ROM and the DVD-ROM.

Furthermore, the navigation system for use in the vehicle described in the present embodiment can also be modified for use in various environments.

Such changes and modifications are to be understood as being within the scope of the present invention as defined by the appended claims.

What is claimed is:

1. A recording system for recording a plurality of data tracks in a data sequence comprising:
a recording unit for recording the plurality of data tracks;
a playback unit for playing the plurality of data tracks;
a retrieval unit for retrieving the data sequence that are retrievably stored on a portable data medium, wherein the retrieval unit retrieves the data sequence on the portable data medium at a retrieval speed, and wherein the retrieval speed is variable between a standard speed and a fast speed that is faster than the standard speed by a preset magnitude;
a control unit for controlling a first process and a second process at a same time after retrieving the data sequence from the portable data medium in a preset order, wherein the first process records the data sequence on the recording unit at a recording speed that is identical to the retrieval speed used for retrieval of the data sequence from the portable data medium by the retrieval unit, and wherein the second process plays the data sequence at the standard speed sequentially; and
a retrieval speed setting unit for setting the retrieval speed for each of the data tracks in the data sequence, wherein the retrieval speed setting unit determines whether a retrieval time of one of the data tracks by the fast speed is smaller than a playback time of a preceding data track in the data sequence by the standard speed,
the retrieval speed setting unit sets the fast speed as the retrieval speed for retrieving the one of the data tracks when the retrieval time of the one of the data tracks is smaller than the playback time of the preceding data track in the data sequence by the standard speed,
the retrieval speed setting unit sets a medium speed that is in a speed range between the standard speed and the fast speed as the retrieval speed for retrieving the one of the data tracks when the retrieval time of the one of the data tracks by the fast speed is not smaller than the playback time of the preceding data track in the data sequence by the standard speed, and
the control unit uses the retrieval speed set by the retrieval speed setting unit for retrieving the data tracks in the data sequence by the retrieval unit.

2. The recording system as in claim 1, wherein the recording system is installed in a vehicle.

3. The recording system as in claim 2, wherein the recording unit is capable of recording map data, and the control unit is capable of executing a navigation process based on the map data recorded by the recording unit in parallel with another process.

4. A program for use in a computer that is functional as the recording system as in claim 1, the program stored in a storage medium comprising a procedure of:
providing a functional equivalent of the control unit of the recording system, and
providing a functional equivalent of the retrieval speed setting unit of the recording system.

5. A recording system for recording a plurality of data tracks in a data sequence comprising:
a recording unit for recording the plurality of data tracks;
a playback unit for playing the plurality of data tracks;
a retrieval unit for retrieving the data sequence that are retrievably stored on a portable data medium, wherein the retrieval unit retrieves the data sequence on the portable data medium at a retrieval speed, and wherein the retrieval speed is variable between a standard speed and a fast speed that is faster than the standard speed by a preset magnitude;
a control unit for controlling a first process and a second process at a same time after retrieving the data sequence from the portable data medium in a preset order, wherein the first process records the data sequence on the recording unit at a recording speed that is identical to the retrieval speed used for retrieval of the data sequence from the portable data medium by the retrieval unit, and wherein the second process plays the data sequence at the standard speed sequentially; and
a retrieval speed setting unit for re-arranging the preset order so that each of the data tracks has a retrieval time by the fast speed that is smaller than a playback time of a preceding data track in a re-arranged order by the standard speed, and for setting a medium speed that is in a speed range between the standard speed and the fast speed as the retrieval speed for retrieving a first data track in the re-arranged order, wherein
the control unit uses the retrieval speed set by the retrieval speed setting unit for retrieving each of the data tracks in the re-arranged order by the retrieval unit.

6. A recording system for recording a plurality of data tracks in a data sequence comprising:
a recording unit for recording the plurality of data tracks;
a playback unit for playing the plurality of data tracks;
a retrieval unit for retrieving the data sequence that are retrievably stored on a portable data medium, wherein the retrieval unit retrieves the data sequence on the portable data medium at a retrieval speed, and wherein the retrieval speed is variable between a standard speed and a fast speed that is faster than the standard speed by a preset magnitude;
a control unit for controlling a first process and a second process at a same time after retrieving the data sequence from the portable data medium in a preset order, wherein the first process records the data sequence on the recording unit at a recording speed that is identical to the retrieval speed used for retrieval of the data sequence from the portable data medium by the retrieval unit, and wherein the second process plays back the data sequence at the standard speed sequentially in order; and
a retrieval speed setting unit for re-arranging the preset order so that each of the data tracks has a retrieval time by the fast speed that is smaller than a remaining playback time of a preceding data track in a re-arranged order by a standard speed, and for setting a medium speed that is in a speed range between the standard speed and the fast speed as the retrieval speed for retrieving a first data track in the re-arranged order, wherein
the control unit uses the retrieval speed set by the retrieval speed setting unit for retrieving each of the data tracks in the re-arranged order by the retrieval unit.

* * * * *